UNITED STATES PATENT OFFICE.

HENRY A. HUDSON, OF LYNDHURST, NEW JERSEY.

MANUFACTURE OF BETON.

SPECIFICATION forming part of Letters Patent No. 324,112, dated August 11, 1885.

Application filed May 25, 1885. (No specimens.)

*To all whom it may concern:*

Be it known that I, HENRY A. HUDSON, of Lyndhurst, in the county of Bergen and State of New Jersey, have invented certain new and useful Improvements in the Manufacture of Beton, a composition to be used as a substitute for natural stone and marble; and I hereby declare the following to be a full, clear, and exact description thereof.

My invention relates to the manufacture of beton; and it consists in certain improvements whereby a beautiful imitation of natural stone or marble can be produced, possessing great strength, hardness, and durability, and capable of receiving a high polish, as hereinafter particularly set forth.

In carrying my invention into effect I first mix thoroughly together ten pounds, more or less, as the work may require, of resin, five pounds of oxide of iron, three pounds of oxide of manganese, two pounds of hydrofluosilicic acid, five pounds of gum-arabic, five pounds of alum, and four pounds of plumbago, and place the mixture in a receptacle by itself. I then place twenty pounds of hydraulic fatty lime in a suitable vessel and dissolve the same in water in order that the latter may become thoroughly impregnated with the lime, and then strain this water and mix it with the ingredients first described, forming my solution ready for use, to each quart of which I add twenty gallons of pure water.

To make an imitation of stone for buildings and other purposes, I take two parts of pure Portland cement and four parts of pure fine washed sand and mix them well together in a suitable box or receptacle, and then in another receptacle I mix thoroughly together one part of cement and six parts of gravel. I then dampen both of the above mixtures with the above-described solution, taking care that every particle of the cement, sand, and gravel is covered with the solution. I next take a mold of the desired shape or design and apply the finer composition of cement and sand around the sides to form the outside of the work, and fill in the mold with the coarser composition of cement and gravel, and after thoroughly tamping I remove the mold from the stone and dampen the latter with the solution above described for three or four days, when it is ready for use.

To manufacture imitations of different varieties of marble or stone, I place the mold of the desired shape on a smooth level surface, and then take one part of Keene's coarse cement and one part of fine sand, mixing the same with my above-described solution to the consistence of paste. I then apply a layer of this mixture from one-half an inch to one inch in thickness to the sides of the mold to form the outside of the work. I then mix one part of pure Portland cement and two parts of sand with a suitable quantity of my above-described solution to render it plastic and fill the mold with the same until it is within one-eighth of an inch of the top. It is then left to set for two or three hours, after which I take calcined plaster and mix the same with my solution until it is of the consistence of cream, and spread it over the material in the mold until it is level with the top of the same, after which a straight-edge is passed over it and it is troweled down, when it will set very rapidly. I next take a suitable tool of the desired shape, or a comb, and draw or pass the same through or over the plaster surface at the top of the mold, to produce veins, angles, or dots, or designs or figures of any required description or shape, to imitate marble, granite, or other stone, thus leaving crevices or furrows in the surface of the plaster; hence there are no air-holes to fill up, as heretofore experienced in the manufacture of artificial marble, which objection has never yet been overcome by the use of any mechanical device with which I am acquainted. I then dampen this surface with the solution, and immediately make a plastic composition, of any desired color or colors, by mixing Keene's superfine cement with my above-described solution and coloring the same with suitable pigments. The different-colored compositions are then placed in the veins, dots, or figures produced as above described, and after standing until set I again dampen with the solution, and then cover the whole surface with a composition having the consistence of thin paste, and composed of Keene's superfine cement mixed with my above-described solution and colored as desired. The surface is then well troweled and allowed to stand until it has become set, after which it is rubbed down smooth with "snake-stone" and water, when all the veins, dots, &c., will appear on the surface, after which it is polished in the same manner as marble.

For outer walls of buildings I go through the same process, using La Farge cement in lieu of Keene's cement.

Sidewalks, monuments, and other cemetery work of all descriptions, building-blocks, and an infinite variety of other articles used for the interior and exterior decoration of buildings in imitation of stone, or marble, can be easily and cheaply produced as above described; and, furthermore, my above-described solution will cause the stone or marble to become carbonized and crystallized, and will produce such a strong and perfect adhesion of the particles as to render the mass extremely hard and solid and impervious to air or water, whereby it is enabled to successfully resist the action of dampness, frost, or heat, and thus adapted for use under all conditions and in any climate.

In making sidewalks I lay a foundation composed of six parts of coarse gravel and one part of cement, and dampen the same with my above-described solution, care being taken not to use too much of the solution. This foundation is laid to the depth of about three inches, more or less, and is well tamped, after which I take equal parts of fine sand and cement and mix them together with my solution to the consistence of mortar and spread it over the above-described foundation, troweling it well until level. Then at distances of from four to six feet apart, as the work may require, I place a perforated sheet-iron strengthening device composed of a perforated bar or narrow plate adapted to extend across the sidewalk, and having at each end a downwardly-extending perforated plate or flange which passes down through the last-mentioned coating, the flanges or side plates of the device being of the thickness of the entire sidewalk, while the perforated top plate or bar is only about one inch deep and extends through to the foundation, the top of the transverse plate or bar lying even with the surface of the work, and becoming, when the material is dry, cemented in the walk, and serving to hold or bind it firmly together and prevent it from contracting or expanding. The material, when the metallic strengthening device is inserted therein, being soft and plastic, will run through the perforations, thus uniting or blending the whole sidewalk together in one continuous surface, there being no separate blocks to be thrown out of place by frost or otherwise, and no crevices for the entrance of air, rain, or moisture; hence there can be no damage by frost, as the stone is impervious to water.

I am aware that tarred paper has been placed between the separate blocks of cement composing a sidewalk, but this paper will rot and leave crevices or openings between the blocks for the entrance of rain and snow, which will freeze therein and produce a raising or heaving of the walk by the action of frost. When the sidewalk is thus laid, the edges of the blocks are exceedingly liable to crumble or break away; but where my perforated metal strengthening device is embedded in the walk, as above described, there are no edges to wear off, the material composing the walk being protected by the perforated metal top bar or plate, which lies level with the surface, as above described.

What I claim as my invention, and desire to secure by Letters Patent, is—

1. The beton composition herein described, composed of sand or gravel and cement united and solidified by mixing therewith a chemical solution formed of water, resin, oxide of iron, oxide of manganese, hydrofluosilicic acid, gum-arabic, alum, plumbago, and hydraulic fatty lime, substantially as and for the purpose set forth.

2. The herein-described liquid compound, consisting of water, resin, oxide of iron, oxide of manganese, hydrofluosilicic acid, gum-arabic, alum, plumbago, and hydraulic fatty lime, substantially in the proportions named, for the purpose of producing the crystallization and carbonization of the beton composition, as described.

Witness my hand this 21st day of May, A. D. 1885.

HENRY A. HUDSON.

In presence of—
P. E. TESCHEMACHER,
W. J. CAMBRIDGE.